(12) United States Patent
Kroll et al.

(10) Patent No.: US 10,318,486 B2
(45) Date of Patent: Jun. 11, 2019

(54) VIRTUAL MACHINE BASE IMAGE UPGRADE BASED ON VIRTUAL MACHINE UPDATES

(71) Applicant: INTERNATIONAL BUSINESS MACHINES CORPORATION, Armonk, NY (US)

(72) Inventors: Marco H. Kroll, Boeblingen (DE); Thomas Pohl, Boeblingen (DE); Martin Troester, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 15/205,056

(22) Filed: Jul. 8, 2016

(65) Prior Publication Data
US 2018/0011871 A1    Jan. 11, 2018

(51) Int. Cl.
*G06F 8/65* (2018.01)
*G06F 9/455* (2018.01)
(Continued)

(52) U.S. Cl.
CPC ............ *G06F 16/1748* (2019.01); *G06F 8/65* (2013.01); *G06F 9/45558* (2013.01); *G06F 16/188* (2019.01); G06F 2009/45562 (2013.01); G06F 2009/45583 (2013.01); G06F 2009/45587 (2013.01)

(58) Field of Classification Search
None
See application file for complete search history.

(56) References Cited

U.S. PATENT DOCUMENTS 8,458,697 B2    6/2013   Amano et al.
8,464,241 B2    6/2013   Hayton
(Continued)

OTHER PUBLICATIONS

Jin, Karen et al., "The Effectiveness of Deduplication on Virtual Machine Disk Images", Proceedings of SYSTOR, May 2009 (12 pages).
(Continued)

*Primary Examiner* — Lewis A Bullock, Jr.
*Assistant Examiner* — Bruce A Ashley
(74) *Attorney, Agent, or Firm* — Steven Chiu; Matthew M. Hulihan; Heslin Rothenberg Farley & Mesiti PC

(57) ABSTRACT

A method for de-duplicating updates in virtual machines (VMs) is provided that may be executed on a host computer u a hypervisor. Client VMs are derived from a base image, and the method includes: creating a temporary virtual machine, updating the temporary virtual machine, identifying modified blocks of the updated temporary virtual machine, and identifying files associated with the modified blocks. Moreover, the method includes determining block identifiers of matching files of a VM corresponding to identified files of the updated temporary VM, moving block content of blocks relating to the determined block identifiers from its initial location to a free location within the client VM if the block content and the matching files are not identical in the client virtual machine and the temporary VM, and de-duplicating content within the client VM, generating a complete bootable image, and replacing the base image by the temporary VM.

13 Claims, 10 Drawing Sheets

(51) Int. Cl.
*G06F 16/174* (2019.01)
*G06F 16/188* (2019.01)

(56) References Cited

U.S. PATENT DOCUMENTS

| | | | |
|---|---|---|---|
| 8,639,658 B1* | 1/2014 | Kumaresan | G06F 3/0641 |
| | | | 707/609 |
| 8,930,652 B2 | 1/2015 | Heim | |
| 9,081,788 B2 | 7/2015 | Bolte et al. | |
| 9,367,244 B2* | 6/2016 | Kulkarni | G06F 3/065 |
| 9,471,590 B2* | 10/2016 | Venkatesh | G06F 17/30174 |
| 2013/0080397 A1* | 3/2013 | Payne | G06F 16/20 |
| | | | 707/681 |
| 2013/0332920 A1* | 12/2013 | Laor | G06F 9/45558 |
| | | | 718/1 |
| 2014/0052698 A1* | 2/2014 | Chen | G06F 9/45558 |
| | | | 707/692 |
| 2014/0229440 A1* | 8/2014 | Venkatesh | G06F 3/061 |
| | | | 707/634 |
| 2015/0052112 A1* | 2/2015 | Shimizu | G06F 17/30156 |
| | | | 707/692 |
| 2015/0067283 A1 | 3/2015 | Basu et al. | |
| 2016/0026492 A1* | 1/2016 | Son | G06F 3/0604 |
| | | | 718/1 |
| 2016/0124764 A1* | 5/2016 | Nithrakashyap | G06F 16/13 |
| | | | 718/1 |

OTHER PUBLICATIONS

Ng, Chun-Ho et al., "Live Duplication Storage of Virtual Machine Images in an Open-Source Cloud", Middleware 2011, 12th Annual Middleware Conference, vol. 7049, Dec. 2011 (20 pages).

* cited by examiner

▼ 1st file
▶ 2nd file
◀ 3rd file
▶ 4th file
* marked to be deleted

▼ 1st file
▶ 2nd file
◀ 3rd file
▶ 4th file
* marked to be deleted

VIRTUAL MACHINE BASE IMAGE UPGRADE BASED ON VIRTUAL MACHINE UPDATES

BACKGROUND

The invention relates generally to a method for de-duplication, and more specifically, to a computer-implemented method, system, and computer-program product for a de-duplication of updates in virtual machines.

Today, the usage of virtual machines (VM) is quite common in order to better utilize existing hardware resources. On top of a hypervisor a plurality of VMs may be operated. In case an error occurs within one VM, the other virtual machines may not be affected negatively. VMs may be deployed completely automatically and may be managed by systems management software like real hardware systems. Especially in Cloud computing environments, it may be useful to quickly start and deploy a new virtual machine for a new user. In order to overcome complications in the process of configuring a new to-be-deployed VM, it is commonplace to just generate a new virtual machine and its environment from a base image. The base image may be a general-purpose VM only designed to be cloned such that the cloned VM may be started instantly on the host computer system and the hypervisor.

Additionally, a process of de-duplication may be used to reduce the total amount of disk space required on the host computer system if a large number of storage blocks of the base image and the cloned VM images are identical. Thus, the cloned or client VMs may only hold those data which are unique to the specific client VM and may —for data blocks of files that are identical with the ones of the virtual machine—only refer back to the image of the base image.

However, over time there may be updates and/or patches deployed to individual client virtual machines. Additionally, there may also be updates to the base image which may not have to be reflected in each client virtual machine because they may be inconsistent with updates performed to individual client virtual machines. Hence, the total required disk space for the base image and the individual client VMs may grow over-proportionally over time. Thus, it may be useful to consolidate the performed updates to the client virtual machines and/or the base image.

SUMMARY

In one or more aspects, a computer-implemented method is provided for de-duplication of updates in virtual machines being executed on a host computer system using a hypervisor, wherein a client virtual machine is derived from a base image. The method includes: creating a temporary virtual machine based on the base image; updating the temporary virtual machine with the updates; identifying modified blocks in a temporary image of the temporary virtual machine when compared to the base image; identifying files associated with the modified blocks in the updated temporary image; determining block identifiers of matching files in the temporary image of the temporary virtual machine corresponding to identified files in the image of the updated temporary virtual machine; moving block content of blocks relating to the determined block identifiers from its initial location to a free location within the client virtual machine if the block content and the matching files are not identical in the image of the client virtual machine and the temporary image of the temporary virtual machine; de-duplicating content within the client virtual machine by replacing block content at an initial location of the matching files in the image of the client virtual machine with pointers to corresponding blocks in the temporary image of the temporary virtual machine; generating a complete bootable image of the temporary virtual machine by using blocks of the base image which have not been updated; and replacing the base image by the image of the temporary virtual machine making the temporary virtual machine a new base image.

In one or more other aspects, a de-duplication system is provided for updates in virtual machines being executed on a host computer system using a hypervisor, wherein a client virtual machine is derived from the base image stored on a host computer system. The de-duplication system includes a memory, and a processor communicatively coupled to the memory, wherein the de-duplication system performs a method including: creating a temporary virtual machine based on the base image; updating the temporary virtual machine with the updates; identifying modified blocks in a temporary image of the temporary virtual machine when compared to the base image; identifying files associated with the modified blocks in the updated temporary image; determining block identifiers of matching files in the temporary image of the temporary virtual machine corresponding to identified files in the image of the updated temporary virtual machine; moving block content of blocks relating to the determined block identifiers from its initial location to a free location within the client virtual machine if the block content and the matching files are not identical in the image of the client virtual machine and the temporary image of the temporary virtual machine; de-duplicating content within the client virtual machine by replacing block content at an initial location of the matching files in the image of the client virtual machine with pointers to corresponding blocks in the temporary image of the temporary virtual machine; generating a complete bootable image of the temporary virtual machine by using blocks of the base image which have not been updated; and replacing the base image by the image of the temporary virtual machine making the temporary virtual machine a new base image.

In one or more further aspects, a computer-program product is provided for de-duplication of common updates in virtual machines being executed on a host computer system using a hypervisor, wherein a plurality of virtual machines are derived from a base image. The computer-program product includes a computer readable storage medium having program instructions embodied therewith, the program instructions being executable by a computer system to cause the computer system to perform a method including: creating a temporary virtual machine based on the base image; updating the temporary virtual machine with the updates; identifying modified blocks in a temporary image of the temporary virtual machine when compared to the base image; identifying files associated with the modified blocks in the updated temporary image; determining block identifiers of matching files in the temporary image of the temporary virtual machine corresponding to identified files in the image of the updated temporary virtual machine; moving block content of blocks relating to the determined block identifiers from its initial location to a free location within the client virtual machine if the block content and the matching files are not identical in the image of the client virtual machine and the temporary image of the temporary virtual machine; de-duplicating content within the client virtual machine by replacing block content at an initial location of the matching files in the image of the client virtual machine with pointers to corresponding blocks in the temporary image of the temporary virtual machine; generating a complete bootable image of the temporary virtual machine by using blocks of the base image which have not been updated; and replacing the base image by the image of the temporary virtual machine making the temporary virtual machine a new base image.

Additional features and advantages are realized through the techniques of the present invention. Other embodiments and aspects of the invention are described in detail herein and are considered a part of the claimed invention.

BRIEF DESCRIPTION OF THE DRAWINGS

It should be noted that embodiments of the invention may be described with reference to different subject-matter. In particular, some embodiments may be described with reference to method type claims whereas other embodiments are described with reference to system type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the system type claims, or the computer-program product type claims, is considered as to be disclosed within this document.

The aspects defined above and further aspects of the present invention will be apparent from the embodiment examples described herein, but to which the invention is not limited.

Figure 1:
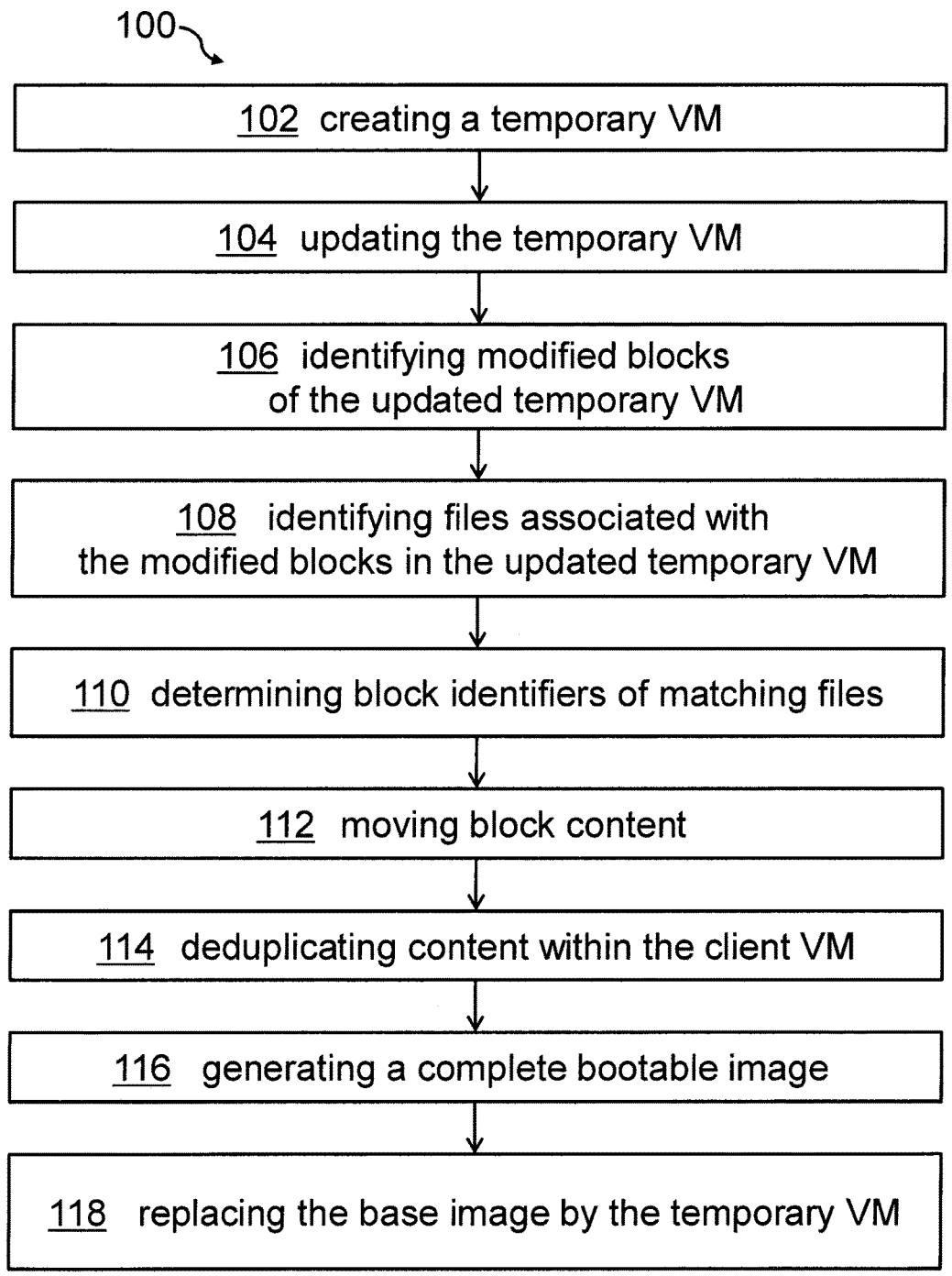
Figure 2A:
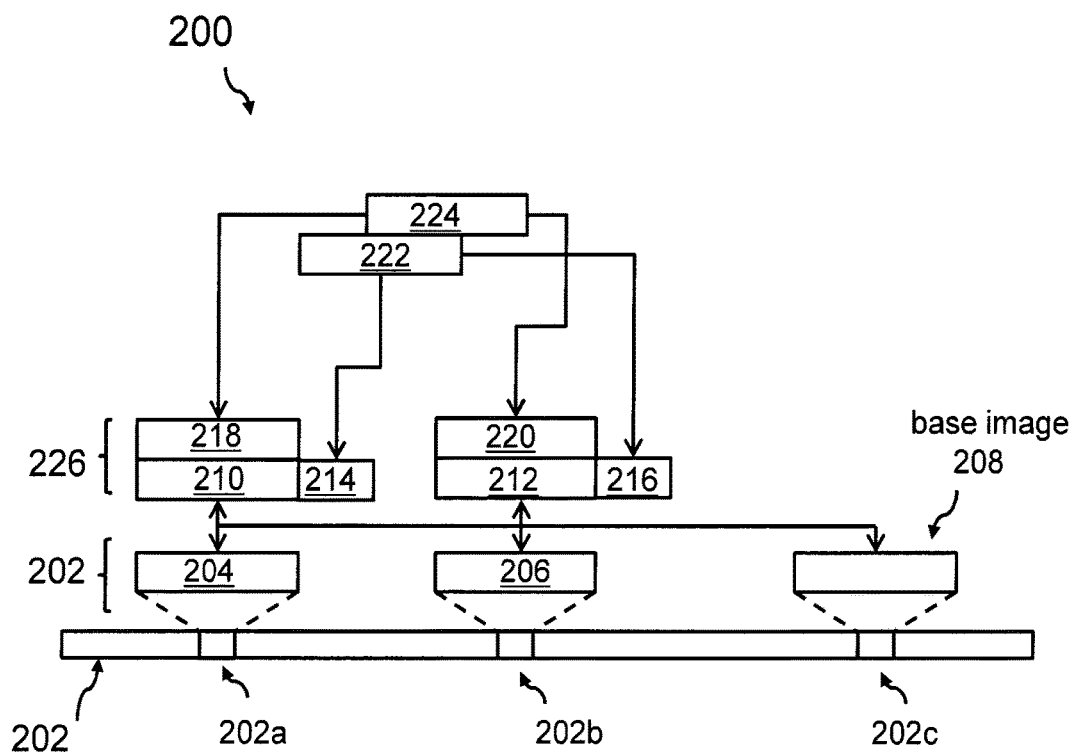
Figure 2B:
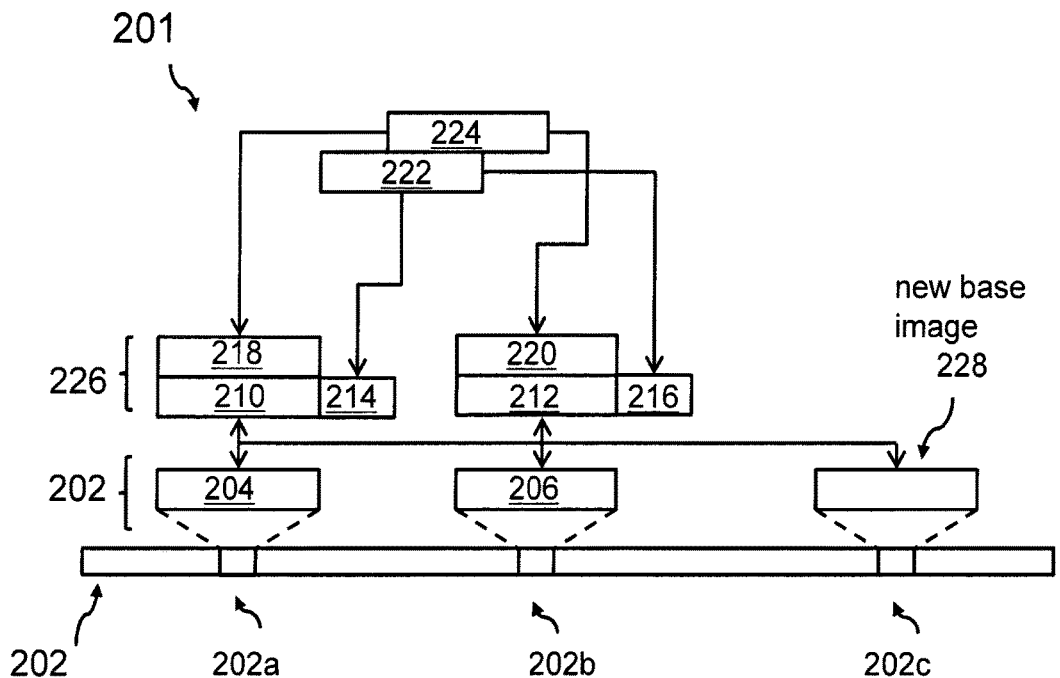
Figure 3:
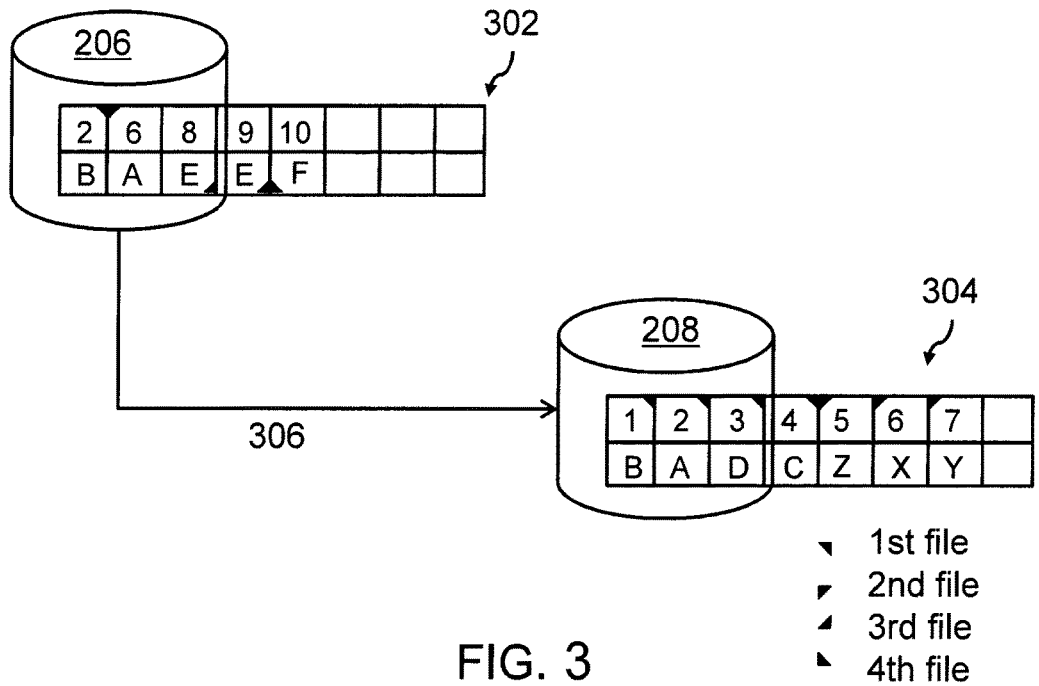
Figure 4:
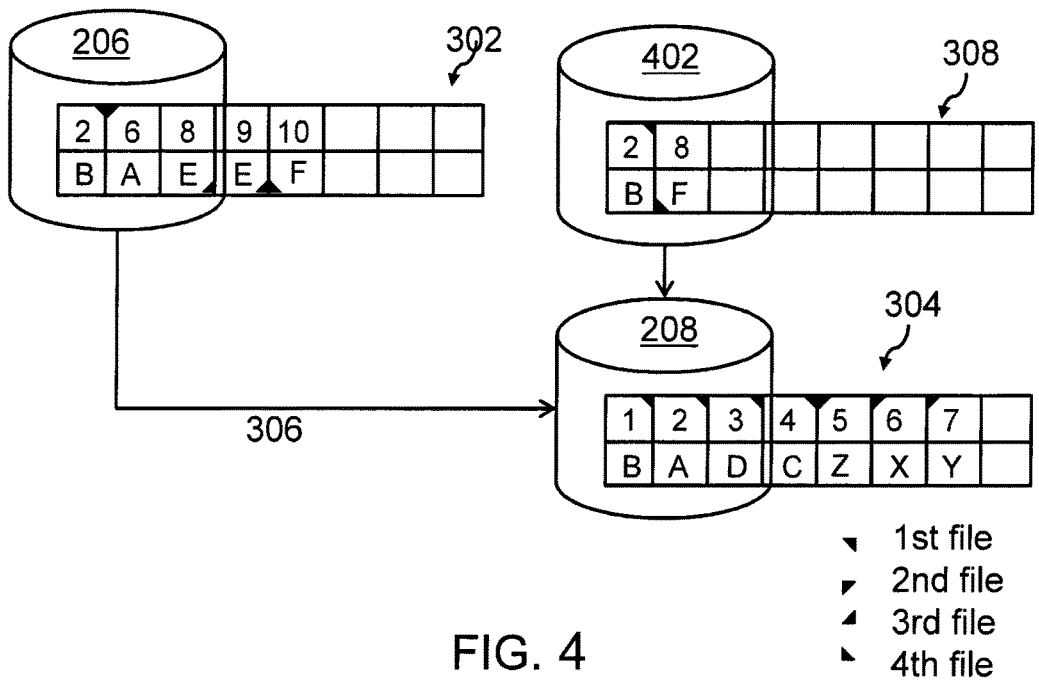
Figure 5:
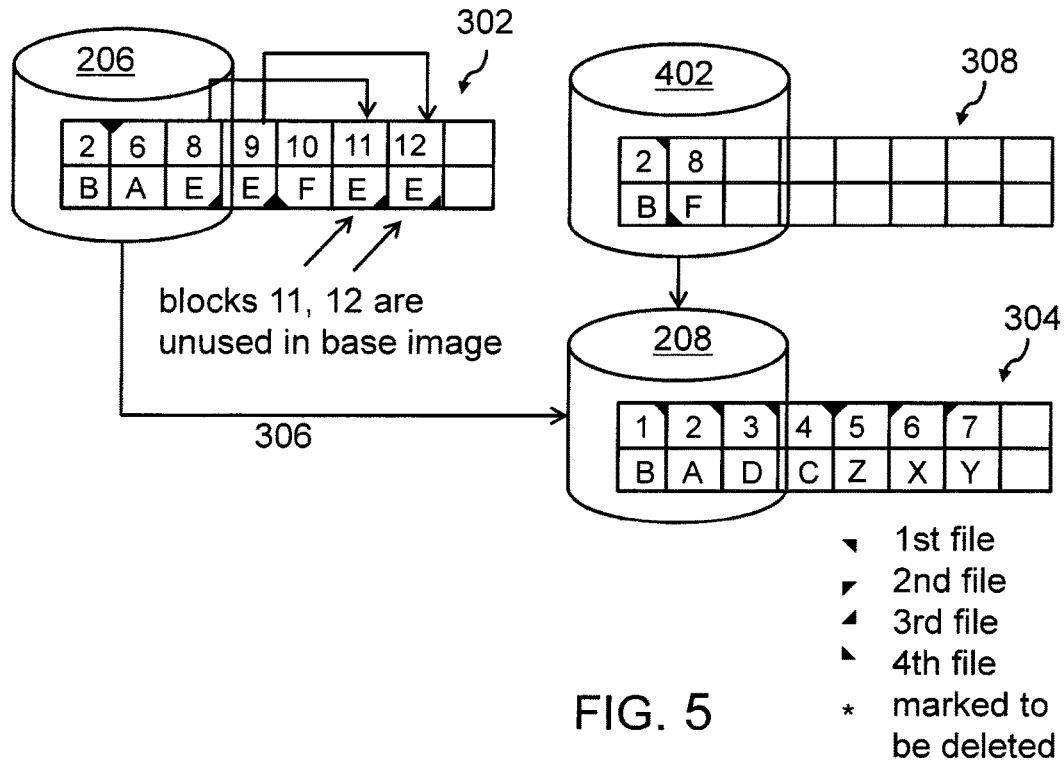
Figure 6:
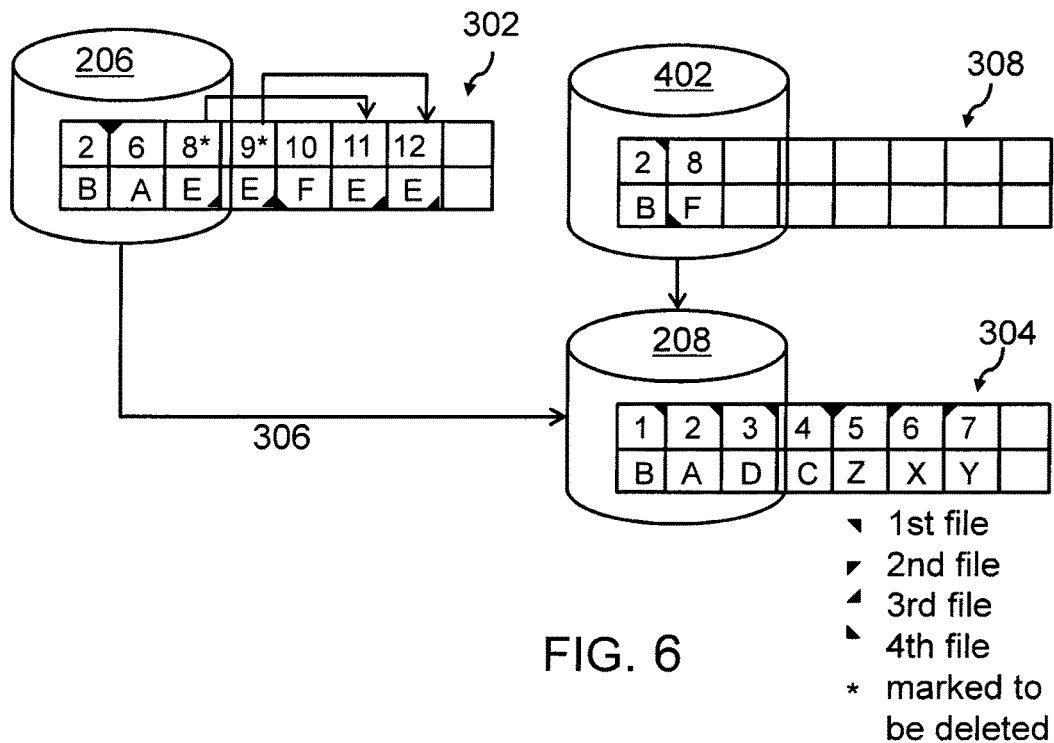
Figure 7:
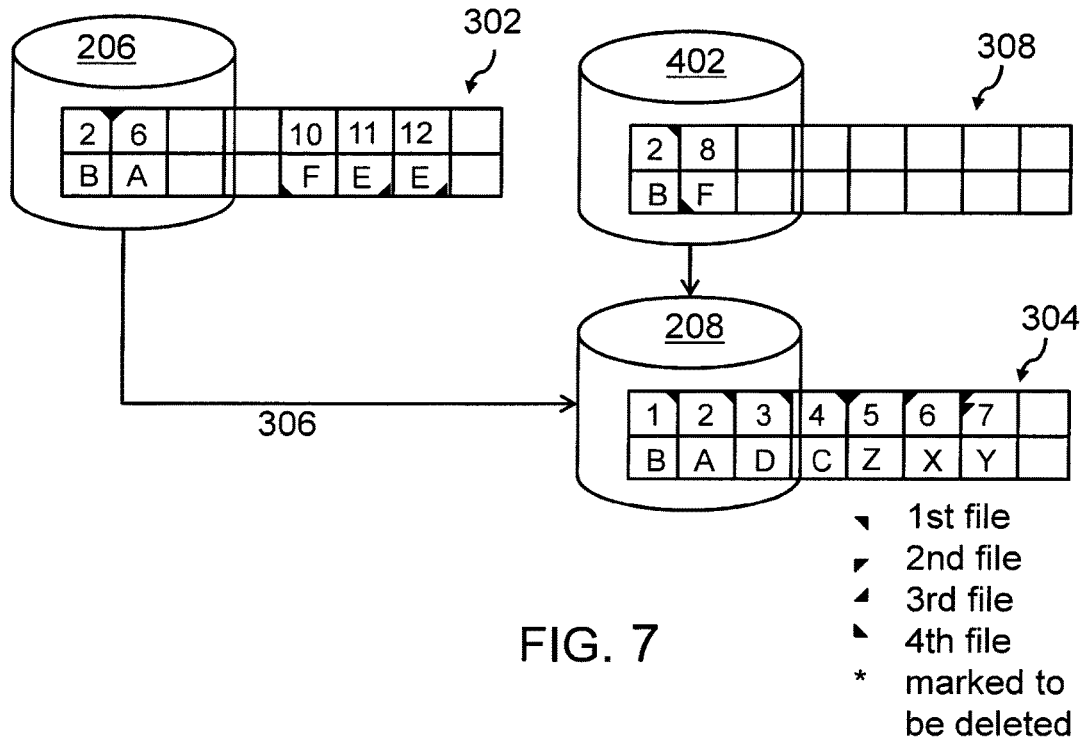
Figure 8:
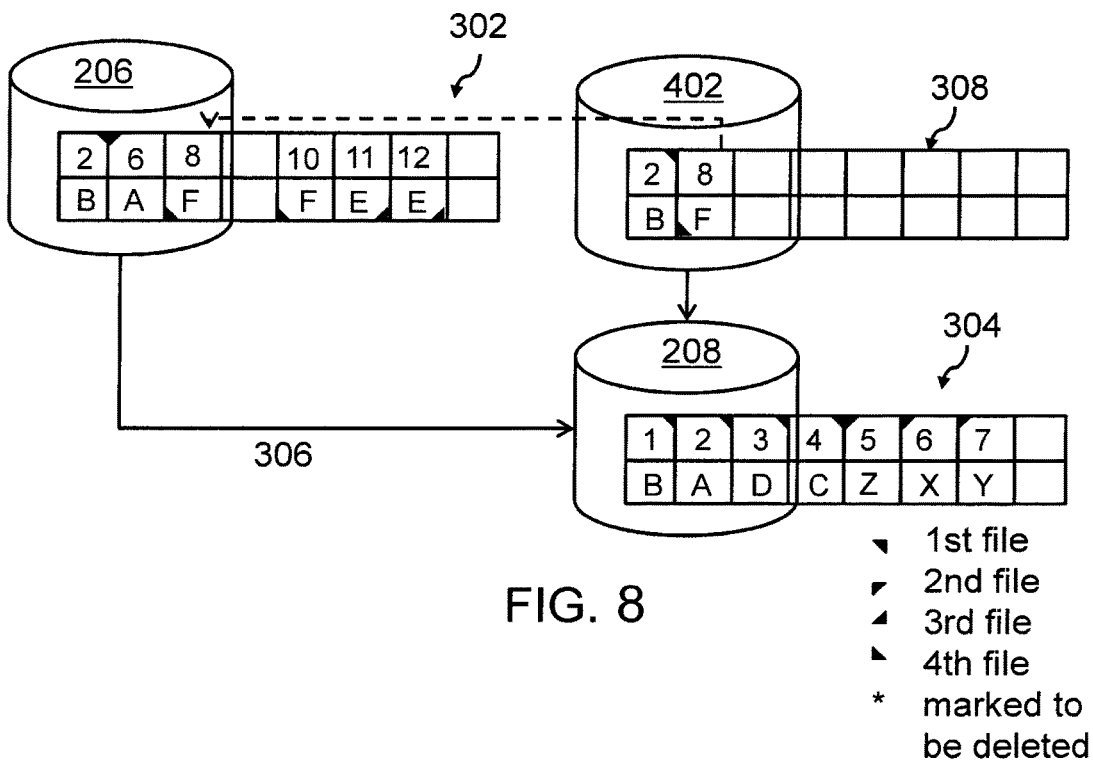
Figure 9:
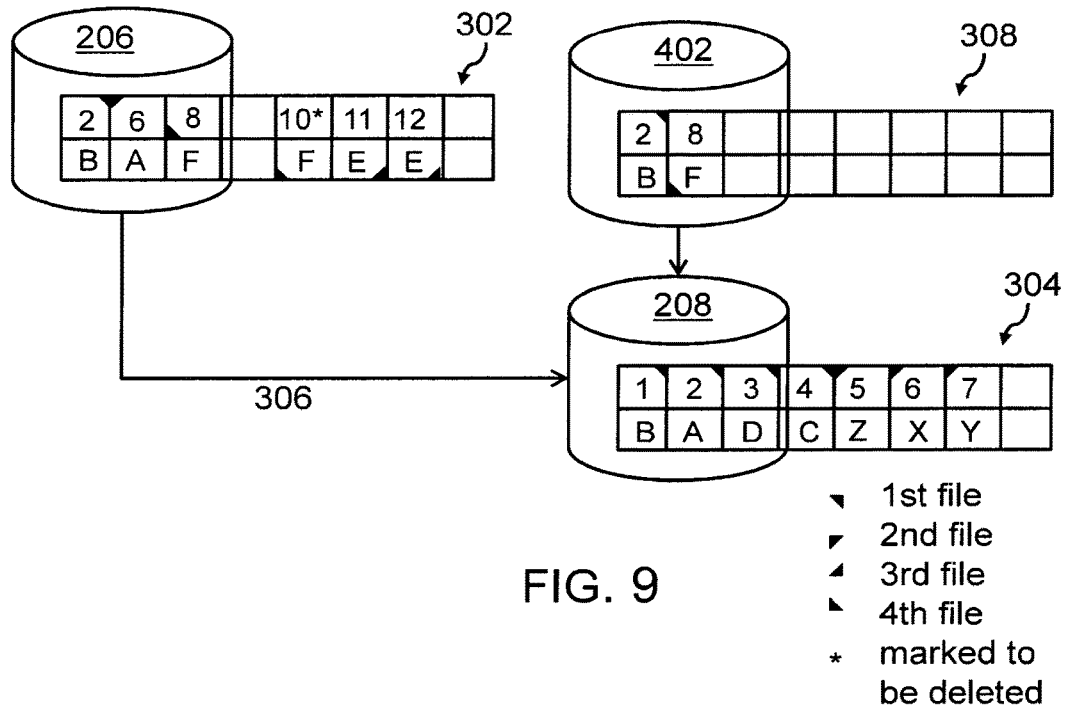
Figure 10:
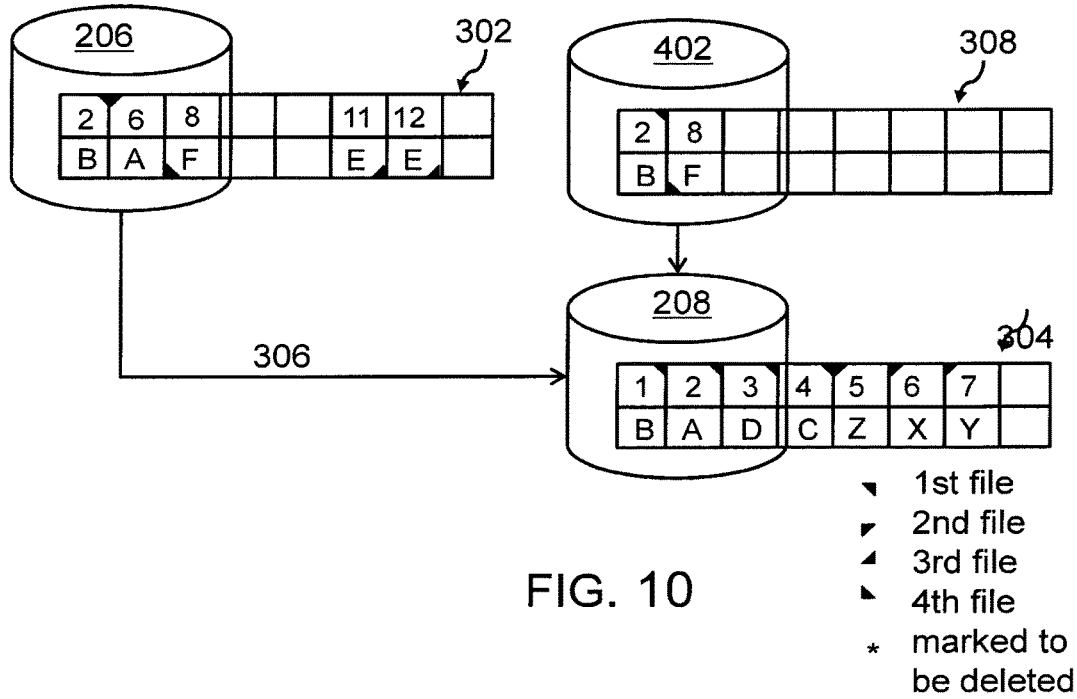
Figure 11:
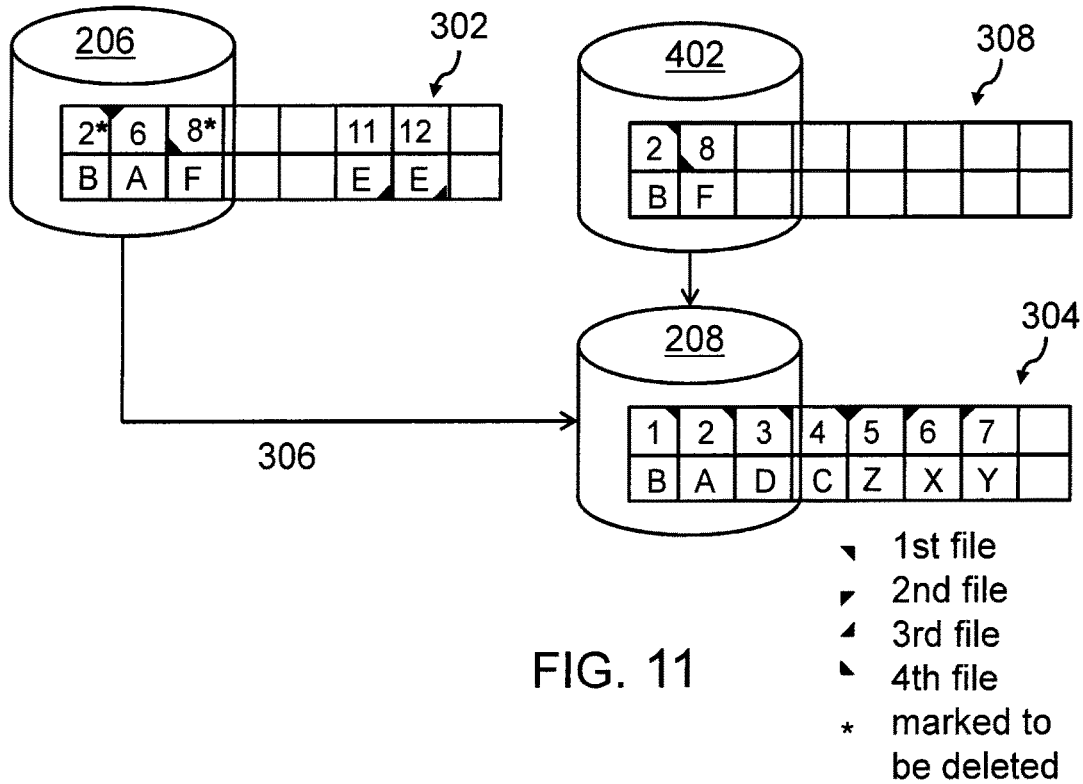
Figure 12:
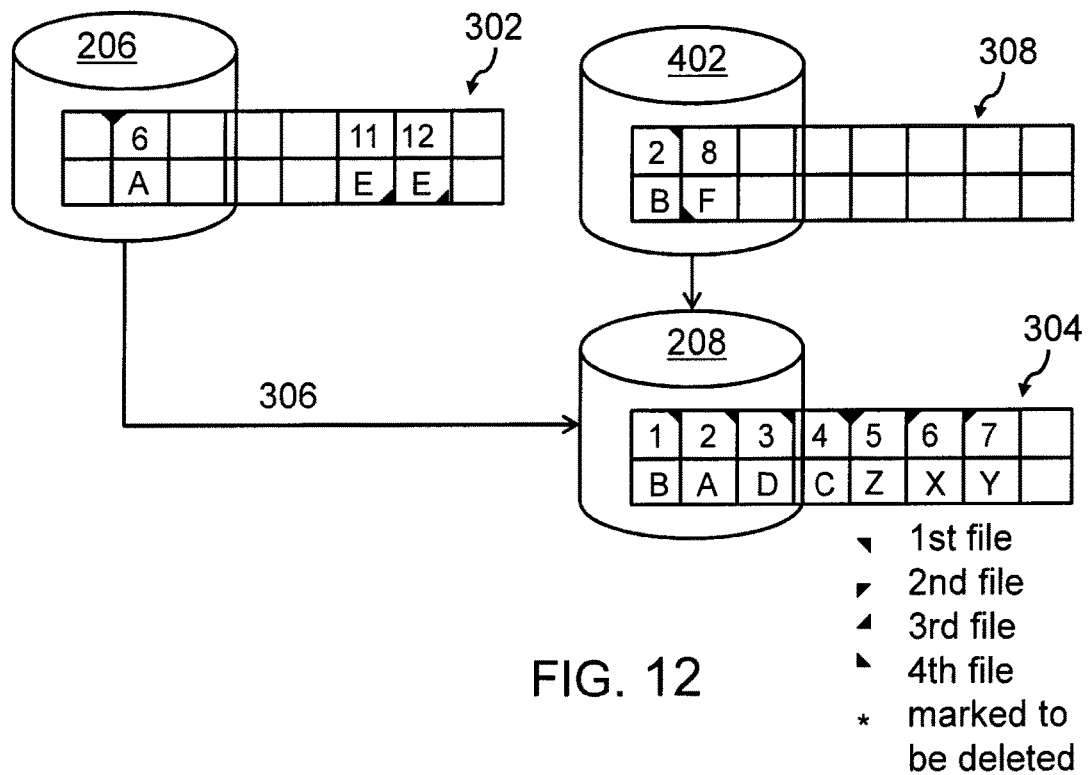
Figure 13:
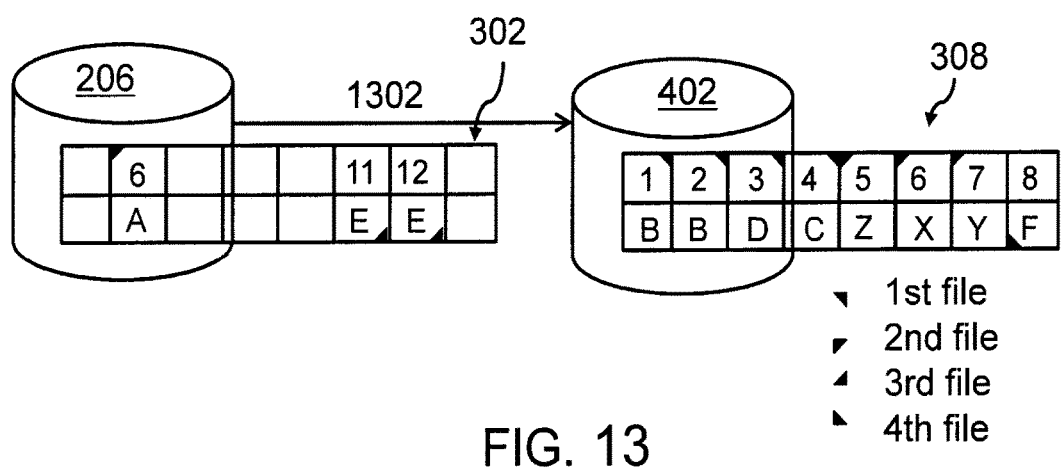
Figure 14:
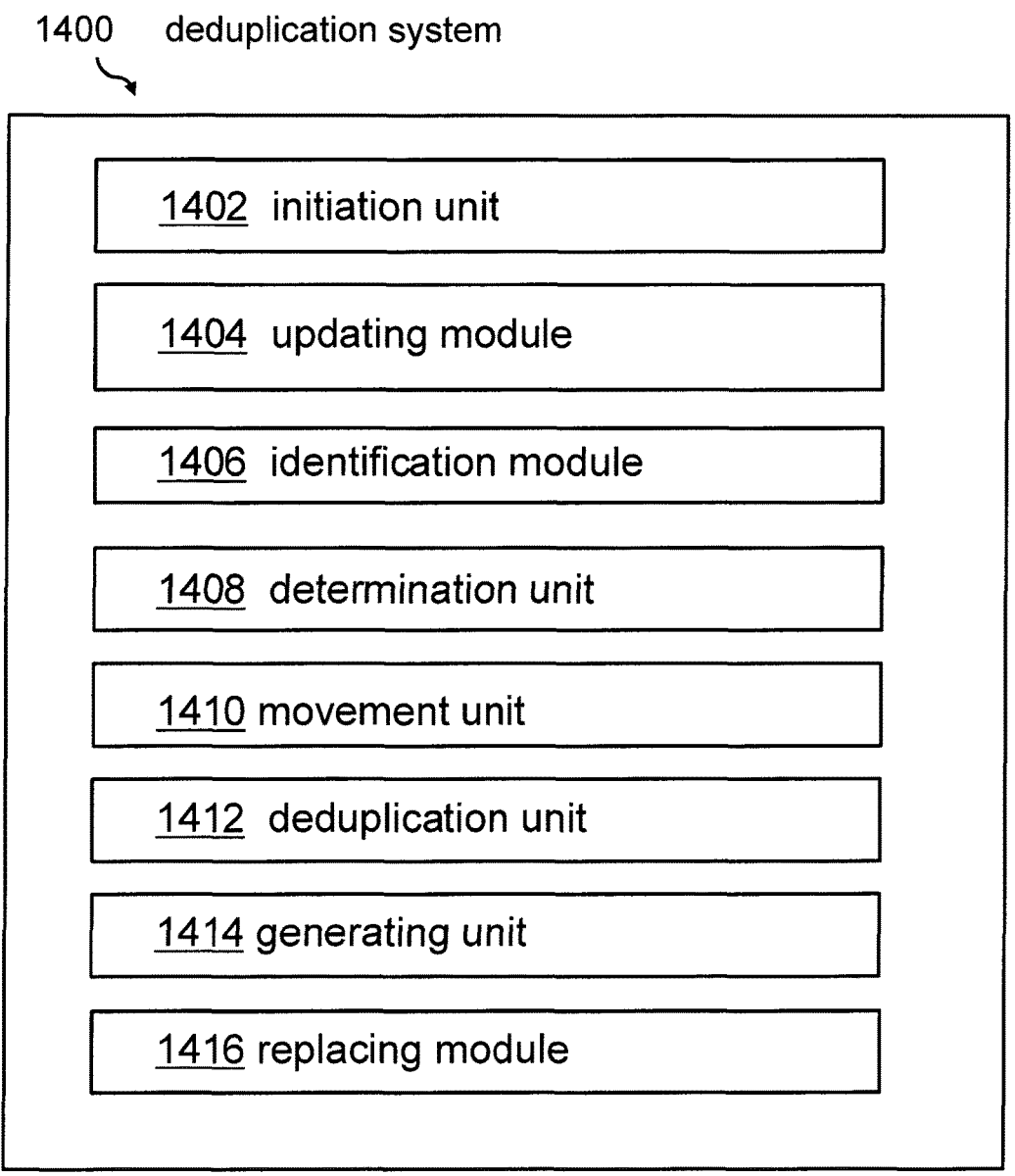
Figure 15:
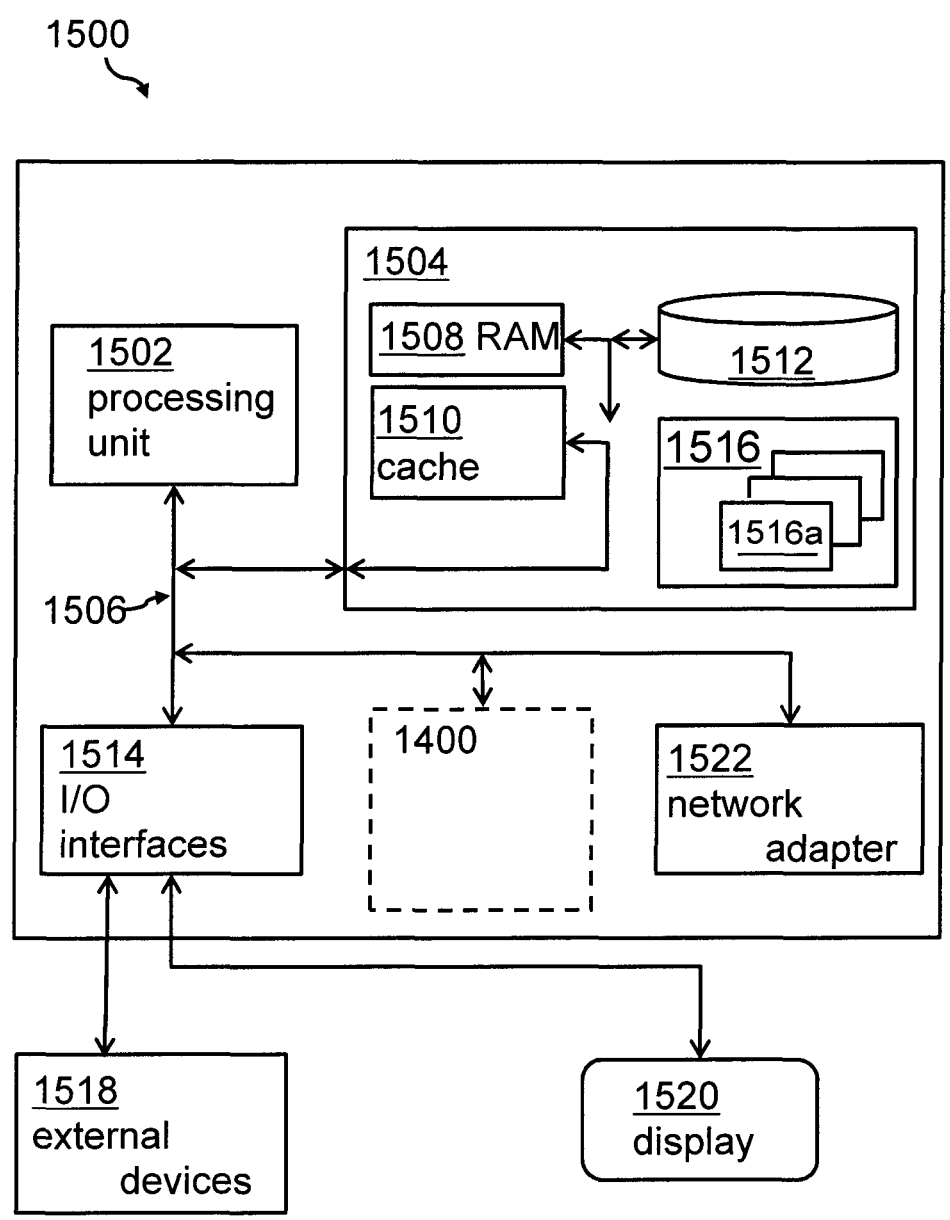

Certain embodiments of the invention are described, by way of example only, and with reference to the drawings, in which:

FIG. 1 shows a block diagram of an embodiment a computer-implemented method for de-duplication updates in virtual machines, in accordance with one or more aspects of the present invention;

FIGS. 2a & 2b show block diagrams of system components before and after applying a computer-implemented method for de-duplication of updates in virtual machines, in accordance with one or more aspects of the present invention;

FIG. 3 shows one example of an original base image and a client VM in an initial status, in accordance with one or more aspects of the present invention;

FIG. 4 shows an upgrade of the temporary image, in accordance with one or more aspects of the present invention;

FIG. 5 shows a clearing of a block by copying files in the client VM, in accordance with one or more aspects of the present invention;

FIG. 6 shows deleting of files in a first step in the client VM, in accordance with one or more aspects of the present invention;

FIG. 7 shows deleting of files in a second step in the client VM, in accordance with one or more aspects of the present invention;

FIG. 8 shows adding differences of the temporary base image, in accordance with one or more aspects of the present invention;

FIG. 9 shows removing duplicate blocks in a first step in the client VM, in accordance with one or more aspects of the present invention;

FIG. 10 shows removing duplicate blocks in a second step in the client VM, in accordance with one or more aspects of the present invention;

FIG. 11 shows merging of the client VM with the temporary base image in a first step, in accordance with one or more aspects of the present invention;

FIG. 12 shows merging of the client VM with the temporary base image in a second step, in accordance with one or more aspects of the present invention;

FIG. 13 shows merging of the temporary base image and the original base image to replace the original base image, in accordance with one or more aspects of the present invention;

FIG. 14 shows a block diagram of an embodiment of a de-duplication system, in accordance with one or more aspects of the present invention; and FIG. 15 shows a block diagram of an embodiment of a computing system including a de-duplication system, in accordance with one or more aspects of the present invention.

DETAILED DESCRIPTION

In the context of this description, the following conventions, terms and/or expressions may be used:

The term 'de-duplication' may denote data de-duplication as a specialized data compression technique for eliminating duplicate copies of repeating data. This technique may be used to improve storage utilization, and may in particular be applied to virtual machine images. In the de-duplication process, unique chunks of data, or blocks, or byte patterns, may be identified and stored during a process of analysis. As the analysis continues, other chunks may be compared to the stored copy and whenever a match occurs, the redundant chunk may be replaced with a small reference (e.g., pointer) that points to the stored chunk or data block. Given that the same byte pattern may occur dozens, hundreds, or even thousands of times (the match frequency may be dependent on the block size), the amount of data that has to be stored may be greatly reduced. A system used to enable a de-duplication of data may be called de-duplication system.

The term 'updates' may denote patches to existing and—in most cases—to used executed software programs. Thus, an update or patch may be a piece of software designed to update a computer program or its supporting data, to fix it or improve it. This may include, e.g., fixing security vulnerabilities and other bugs, with such patches usually called bug fixes, and/or improving the usability or performance.

The term 'virtual machine'—or in short VM—may denote an emulation of a particular computer system. Virtual machines may be operated based on the computer architecture and functions of a real or hypothetical computer, and their implementations may involve specialized hardware, software, or a combination of both. A VM may represent a substitute for the targeted real machine and a level of functionality required for an execution of a complete operating system. A hypervisor may use native execution to share and manage hardware, allowing multiple different VMs, isolated from each other, to be executed on the same physical machine.

The term 'hypervisor', also known as virtual machine monitor (VMM) may denote a piece of computer software, firmware or hardware that creates and runs virtual machines. A computer, on which a hypervisor is running one or more virtual machines may be defined as a host machine. Each virtual machine may be called a guest machine or client VM. The hypervisor may present the guest operating systems with a virtual operating platform and may manage the execution of the guest operating systems and/or client VM.

Multiple instances of a variety of operating systems may thus share the virtualized hardware resources.

The term 'base image' may denote an original software image from which client virtual machines may be derived by a copy process. Thus, a client virtual machine does not need to be configured again and again for every start of a new client VM; it only needs to be copied and control may be handed over to the hypervisor in order to start the newly copied client VM. In the currently proposed method, the client virtual machines may be derived using a copy-on-write process. The same may apply to the generation of the temporary virtual machine.

The term 'temporary virtual machine' may denote a virtual machine, created in a comparable way a new client VM may be created, e.g., by copying the base image.

The term 'copy-on-write technique'—also known as COW—may denote an optimization strategy used in computer programming and operation. Copy-on-write stems from the understanding that when multiple separate tasks use initially identical copies of some information (i.e., data stored in computer memory or disk storage), treating it as local data, each task working on its own "copy of the data", that they may occasionally need to modify, then it is not necessary to immediately create separate copies of that information for each task. Instead they can all be given pointers to the same resource, with the provision that on the first occasion where they need to modify the data, they must first create a local copy on which to perform the modification (the original resource remains unchanged). When there are many separate processes all using the same resource, each with a small likelihood of having to modify it at all, then it is possible to make significant resource savings by sharing resources this way. Copy-on-write is the name given to the policy that whenever a task attempts to make a change to the shared information, it should first create a separate (private) copy of that information to prevent its changes from becoming visible to all the other tasks. If this policy is enforced by the hypervisor, then the fact of being given a reference to shared resources and/or information rather than a private copy can be transparent to all tasks, whether they need to modify the information or not.

The term 'booting' may denote the initialization of a computerized system and, in particular, the initialization of a virtual machine, e.g. the client VM or the temporary VM.

The disclosed computer-implemented method for de-duplication of updates in virtual machines may offer multiple advantages and technical effects.

For instance, in typical virtual computing environments including a plurality of VMs running on one or more host computers and being derived from a single base image, updates to one or more of the client VMs or client virtual machines reduce the potential of de-duplication between a specific client VM and the base image. It may be noted that deriving the client VMs may be performed using a COW process. Typically, a client VM differentiates itself only in a limited number of files and related data blocks if compared to the base image the client VM was derived from. However, if client VMs are updated by patches for any reasons the number of common data blocks between the original base image and each of the plurality of clients VMs may decrease. Thus, a controlled consolidation process would be required in order to consolidate all performed updates to the client VMs in a consolidated new base image which would afterwards be used as a new base image for newly generated client VMs. These newly generated client VMs would thus reflect the latest update standard for client VMs, such that only future updates would be required for the client VMs.

Hence, the number of data blocks for a potential de-duplication grows significantly because of the increased commonality between a new consolidated base image and each of the plurality of client VMs. Therefore, the proposed method is favorable for optimizing using the resources consumption on the host computer running the hypervisor and the plurality of client VMs. As a consequence, more client VMs may run on the same host computer or, alternatively, the same number of client VMs may be executed with a better performance. Also alternatively, each client VM may operate on a larger individual file system without requiring more physical resources on a physical hard drive. Thus, based on the inventive concept, the base image may become upgradable during the runtime of a system of a plurality of client VMs.

In the following, additional embodiments of the inventive concepts disclosed herein are also described.

According to one advantageous embodiment of the method, creating a temporary virtual machine may be performed by a copy-on-write technique. This may save significant storage and computing resources because redundant blocks of information in a plurality of client VMs may have no need to be copied. The same storage location may be referenced for identical data block in different client VMs.

According to another advantageous embodiment of the method, updating the temporary virtual machine with the updates may include booting the temporary virtual machine before the updating or applying the updates. The reason may be the ability of the VM, in particular the temporary virtual machine, to perform updates to itself—also known as self-update. A skilled person may know such processes from the well-known Windows operating system or a distribution of the Linux operating system. Hence, the updating—or applying the patches—may not need any external software components to the VM but only those resources being implemented with a VM or the related operating system.

According to one embodiment of the method, identifying modified blocks of the updated temporary image may include using block identifiers determined during performing the copy-on-write technique. This may also be instrumental for saving computing resources. As the information on which block of a VM may have been modified is already available during the copy-on-write process, this information may be reused during this process.

According to another embodiment of the method, moving block content may include replacing content of the matching files of the image of the client VM with reference to the matching file in the image of the temporary virtual machine. Thus, the client VM is "emptied" of redundant content that may already be present in the updated temporary VM.

According to a further embodiment of the method, moving block content may include comparing content of each identified file of the image of the updated temporary VM with the image of the client VM resulting in block identifiers of the matching files.

According another embodiment of the method, replacing the base image by the base image of the image of the temporary virtual machine may include deleting the base image—in particular the existing or old base image—and replacing all pointers—in particular those used by the client VMs to refer back to the base image for storage saving purposes—to the base image by pointers to the new base image. Thus, the client VMs are again fully functional because each client VM may represent a complete software image even if being built out of storage blocks of the client VM itself and additional storage blocks of the new base image.

According to one optional embodiment of the method, de-duplicating content within the image of the client virtual machine may include ensuring that an original sequence of blocks per matching file may continue to stay and may be unchanged if compared to an original file. Thus, from a client VM user perspective, the update process is completely transparent. Everything works as before the update(s) has (have) been implemented.

In the following, a detailed description of the figures will be given. All instructions in the figures are schematic. Firstly, a block diagram of an embodiment of the inventive computer-implemented method for de-duplication updates in virtual machines is given. Afterwards, further embodiments as well as embodiments of the de-duplication system for updates in virtual machines will be described.

FIG. 1 shows a block diagram 100 of an embodiment of the computer-implemented method for de-duplication updates, e.g., patches, in virtual machines being executed on a host computer system using a hypervisor. A client virtual machine, i.e., one of a plurality of client VMs may be derived from a base image. The method includes creating, 102, a temporary virtual machine based on the base image. Here, a copy-on-write process is used. The base image of the temporary VM may initially be an empty sparse file with a plurality of reference pointers to the base image due to the copy-on-write process. Then, the method includes updating, 104, the temporary virtual machine. The temporary VM may be booted before the update process in order to allow using self-update capabilities. In step 106, the method includes identifying modified blocks in a temporary image of the updated temporary virtual machine if compared to the base image. This may happen due to the implemented updates. However, this may also be a by-product or an automatic result of the COW process, as mentioned above.

In a next step, the method proceeds with identifying, 108, files associated with the modified blocks in the updated temporary image. In order to operate with a consistent file system and a consistent client VM, it is required to relate to files in the client VM and the temporary VM. They should stay in synch and related data blocks should also keep the same sequence. Consequently, the method-related process continues with determining, 110, block identifiers of matching files of the image of the virtual machine corresponding to identified files of the image of the updated temporary virtual machine, i.e., the temporary VM.

Then, it continues with moving, 112, block content of blocks relating to the determined block identifiers from its initial location to a free location within the image of the client virtual machine if the block content and the matching files are not identical in the image of the client virtual machine and the image of the temporary virtual machine. That is, if the content of the related block is identical, a movement is not required. The free location is a storage location currently not used by the client VM, the temporary VM and the base VM.

Furthermore, the process continues with de-duplicating, 114, content within the client virtual machine by replacing block content at an initial location of the matching files in the image of the client virtual machine with pointers to corresponding blocks in the image of the temporary virtual machine. This may, in particular, ensure that an original sequence of blocks stays unchanged if compared to the original file.

As a further step, the process may continue with generating, 116, a complete bootable image of the temporary virtual machine by using blocks of the base image which have not been updated. This process may not use copy-on-write-techniques because a consistent, completely new image is required that may replace the original bootable base image. The original base image may be replaced, 118, by the image of the temporary virtual machine making the temporary virtual machine a new base image. In addition, the original, old base image may be deleted to free storage resources. It may also be noted that not only one single client VM needs updated pointers to the new base image, but all client VMs which depend on the same base image.

FIGS. 2a & 2b show block diagrams of a more detailed technical environment 200, 201 for performing the above described method. Reference numeral 202 refers to a physical storage system of a host computing system. Different disk images 204, 206 and 208 including filesystems each mapped to specific locations 202a, 202b, 202c on the physical disk 202. The base image 208 may be represented by the rightmost block of images. The other two disk images 204, 206 may represent two of a plurality of virtual machines represented by the user space 206. Each user space of each virtual machine is shown with a QEMU process 210, 212 (QEMU stands for Quick Emulator and may be—among others—a commonly used system for disk emulation), each having an application programming interface 214, 216 and a hard disk application programming interface 218, 220. The de-duplication application programming interfaces 214, 216 are controlled by a de-duplication module 222 and the hard disk API (application programming interface) may be controlled by a cloud management system 224.

FIG. 2a shows the situation before a de-duplication after implementing updates to the base image 208. In contrast, FIG. 2b shows a situation in which the base image 208 has been replaced by the new base image 228. The original base image 208 has already been deleted at this point in time.

In a short, structural form, the de-duplication process may be summarized as follows:

Create and start a new VM 212 (with image X) based on base image 208
    Ensure all VMs are patched: Apply patches to VM 212 and all images based on image 208
        After the patch VM 212 and VM 210 differ
    Stop all VMs (VM 212 and all user images depending on base image 208)
    Call de-duplication API to identify modified blocks
    Identify files F associated to these modified blocks in VM 212 (based on image 208)
        These files belong to the update step
    For each image 210 based on image 208
        For each file F in image VM 210
            Compare content.
            If file matches:
                Get block IDs of F in VM 212
                Get block IDs of F in VM 210
                File system in VM 210: Move block IDs of F in VM 210 to correlate to block IDs in VM 212
                    If block IDs of VM 212 are occupied in VM 210, occupied blocks have to be moved and file system has to be updated accordingly.
                Replace content in VM 210 with reference to VM 212
                Clear blocks in VM 210

In order to further reduce the required disk space on hard drive 202 the following management process may be deployed (in the same short form as above):
    Get block IDs of F in VM 212
    Get block IDs of F in VM 210

File system in VM 210: Move block IDs of F in VM 210 to correlate to block IDs in VM 212
  If block IDs of VM 212 are occupied in VM 210, occupied blocks have to be moved and file system has to be updated accordingly.
  If file size differs only move the minimum amount of data to correspond to VM 212:
    If F in VM 210 is larger only move file blocks that exist in VM 212
    If F in VM 212 is larger only move file blocks that exist in VM 210
  For each block B in file F in image VM 210:
    If B in VM 210 matches B in VM 212:
      Replace B in VM 210 with reference to B in VM 212
      Clear B
    If file not in VM 212 or If no match:
      Get block IDs of F in VM 210
      For each block in VM 210 which references A: copy block to VM 210
      One has to ensure that no content in VM 210 is still referencing base image 208

It may be noted that reference numeral 226 may represent the user space and reference numeral 202 may represent the file system.

FIGS. 3-13 show possible statuses of an implementation of a method, in accordance with one or more aspects of the present invention.

FIG. 3 shows the original base image 208 and the image of the client VM 206 in an initial status. Reference numeral 304 depicts an example of a series of data blocks 1, 2, 3, 4, 5, 6, 7 shown in the top row. They are shown with the content "B", "A", "D", "C", "Z", "X","Y"in the same sequence as the data blocks in the bottom row. On the other side, client VM 206 may include data blocks 302 with numbers 2, 6, 8, 9, 10 with content "B", "A", "E", "E" and "F".

Thus, for instance, data block 1 may store data "B" and data block 3 may store data "D", etc. There are also shown black edges within the blocks. Data blocks/data with the same mark in one corner may belong to a same data file. Thus, in the base image data 208 blocks 1, 2, 3, 4 belong to the same data file. The same may apply for data blocks 5, 6, 7, etc. The arrow 306 indicated that the image of the client VM 206 refers back to the base image 208 for data that are de-duplicated. The image of the client VM 206 holds only those data that were changed compared to the base image 208. These data may have come to the client VM 206 as updates. These updates have not been reflected in the base image. It may also be noted that different client VMs may include different updates and thus different content that is de-duplicated in conjunction with the base image 208.

FIG. 4 shows an upgrade of a temporary image of a temporary virtual machine 402. Before, the image of the temporary VM 402 may have been created from the base image 208 by a copy-on-write process, that is, initially the temporary image of the temporary VM 402 may just be an empty sparse file because almost all its data blocks 308 have a back reference to the base image 208. However, here it is shown that the temporary image of the temporary VM 402 received an update, namely blocks 2 and 8. It may be noted also that the temporary image of the temporary VM 402 refers back to the base image 208 for de-duplicated data blocks.

FIG. 5 shows a clearing of blocks by copying files within the image of the client VM 206. As can be seen, the content of data blocks 8 and 9—namely, "E", "E"—are moved to become blocks 11 and 12 (as indicated by the arrows) which are empty or not used in the client VM 206.

FIG. 6 shows identifying files for deletion in a first step in the client VM 206. It may be noted that blocks 8 and 9 now also include an "*". This may indicate that the content from these blocks may be deleted in the process next step.

FIG. 7 shows deleting of files in a second step in the image of the client VM 206. Now, the data blocks 8 and 9 are cleared—they are not shown any longer.

FIG. 8 shows adding differences to the client VM 206. Here, the content of block 8 with content "F" is added to the client VM 206 from the temporary VM 402. It may be noted that it may not be required to also add block 2 with content "B" to the client VM 206 because it is already there.

FIG. 9 shows removing duplicate blocks in a first step in the client VM 206. Here, duplicates are identified within the base image 208 of the client VM 206. The content "F" appears twice: in block 8 and 10, which refer to the same data in the same file. Thus, the content from block 10 may be deleted, indicated with an "*".

FIG. 10 shows removing duplicate blocks in a second step from the image of the the client VM 206. Now, block 10 is not shown any longer; the content has been deleted.

FIG. 11 shows merging of the client VM 206 with the temporary VM 402 in a first step. Blocks 2 and 8 are marked for de-duplication/deletion as marked with "*" in the client VM 206.

FIG. 12 shows merging of the base image of the client VM 206 with the image of the temporary VM 402 in a second step. Now, the content of blocks 2 and 8 in the client VM 206 are removed/not shown any longer.

FIG. 13 shows merging of the image of the temporary VM and the original base image to replace the original base image. In this pre-final step the image of the temporary VM 402 is filled with content from the base image 208 for those blocks that are not already contained in the temporary VM 402. Hence, blocks 1, 3, 4, 5, 7, and 8 are copied. Blocks 2 and 8 are taken from the temporary image 402. Hence, a bootable image is created out of the temporary VM 402.

In a further step, the reference from the client VM 206 to base image 208 may be replaced by a reference to the temporary VM 402, indicated by arrow 1302 in FIG. 13. The base image 208—not shown any longer—is then deleted. The image of the temporary VM 402 replaces the original base image 208.

FIG. 14 shows a block diagram of an embodiment of the de-duplication system 1400. The de-duplication system 1400 for updates in virtual machines, being executed on a host computer system using a hypervisor, is shown with active blocks. The client virtual machine is derived from a base image stored on a host computer system. The de-duplication system includes an initiation unit 1402 adapted for creating a temporary VM based on the base image, an updating module 1404 adapted for updating the temporary virtual machine with the updates, and an identification module 1406 adapted for identifying modified blocks of the image of the updated temporary virtual machine if compared to the base image. The identification module 1406 is also adapted for identifying files associated with the modified blocks in the image of the updated temporary virtual machine.

Furthermore, the de-duplication system 1400 includes a determination unit 1408 adapted for determining block identifiers of matching files of the image of the virtual machine corresponding to identified files of the updated image of the temporary virtual machine, and a movement unit 1410 adapted for moving block content of blocks relating to the determined block identifiers from its initial location to a free location within the image of the client virtual machine if the block content and the matching files are not identical in the image of the client virtual machine and the image of the temporary virtual machine.

Additional units of the de-duplication system are shown as a de-duplication unit 1412 adapted for de-duplicating content within the image of the client virtual machine by replacing block content at an initial location of the matching files in the image of the client virtual machine with pointers to corresponding blocks in the image of the temporary virtual machine, a generating unit 1414 adapted for generating a complete bootable image of the temporary virtual machine by using blocks of the base image which have not been updated, and a replacing module 1416 adapted for replacing the base image by the image of the temporary virtual machine making the image of the temporary image a new base image.

Those skilled in the art will note from the above discussion that, according to one aspect of the present invention, a computer-implemented method for a de-duplication of updates in virtual machines may be provided. The virtual machines may be executed on a host computer system using a hypervisor. A client virtual machine (VM)—typically a plurality of client virtual machines—may be derived from of a base virtual machine, i.e. base image. The method may include creating a temporary virtual machine based on the base, and updating the temporary virtual machine with updates.

Additionally, the method may include identifying modified blocks in a temporary image of the updated temporary image if compared to the base image, and identifying files associated with the modified blocks in the updated temporary virtual machine.

Furthermore, the method may include determining block identifiers of matching files of the image of the virtual machine corresponding to identified files of the image of the updated temporary virtual machine, moving block content of blocks relating to the determined block identifiers from its initial location to a free location within the image the client virtual machine if the block content and the matching files are not identical in the image of the client virtual machine and the image of the temporary virtual machine, and de-duplicating content within the client virtual machine by replacing block content at an initial location of the matching files in the image of the client virtual machine with pointers to corresponding blocks in the image of the temporary virtual machine, and generating a complete bootable image of the temporary virtual machine. Finally, the method may include replacing the base image by the image of the temporary virtual machine making the temporary virtual machine a new base image.

According to a second aspect of the present invention, a de-duplication system for updates in virtual machines being executed on a host computer system using a hypervisor may be provided. A client virtual machine may be derived from a base image stored on a host computer system. The de-duplication system may include an initiation unit adapted for creating a temporary virtual machine based on the base image, an updating module adapted for updating the temporary virtual machine with the updates, and an identification module adapted for identifying modified blocks of the image of the updated temporary virtual machine if compared to the base image, wherein the identification module is also adapted for identifying files associated with the modified blocks in the image of the updated temporary virtual machine.

Furthermore the de-duplication system may include a determination unit adapted for determining block identifiers of matching files of the virtual machine corresponding to identified files of the updated image of the temporary virtual machine, a movement unit adapted for moving block content of blocks relating to the determined block identifiers from its initial location to a free location within the image of the client virtual machine if the block content and the matching files are not identical in the image of the client virtual machine and the image of the temporary virtual machine, and a de-duplication unit adapted for de-duplicating content within the image of the client virtual machine by replacing block content at an initial location of the matching files in the image of the client virtual machine with pointers to corresponding blocks in the image of the temporary virtual machine.

In addition, the de-duplication system may include a generating unit adapted for generating a complete bootable image of the temporary virtual machine by using blocks of the base image which have not been updated, and a replacing module adapted for replacing the base image by the temporary virtual machine making the temporary virtual machine a new base image.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

Embodiments of the invention may be implemented together with virtually any type of computer, regardless of the platform being suitable for storing and/or executing program code. FIG. 15 shows, as an example, a computing system 1500 suitable for executing program code related to one or more aspects of the disclosed method.

The computing system 1500 is only one example of a suitable computer system and is not intended to suggest any limitation as to the scope of use or functionality of embodiments of the invention described herein. Regardless, computer system 1500 is capable of being implemented and/or performing any of the functionality set forth hereinabove. In the computer system 1500, there are components, which are operational with numerous other general purpose or special purpose computing system environments or configurations. Examples of well-known computing systems, environments, and/or configurations that may be suitable for use with computer system/server 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1500 may be described in the general context of computer system-executable instructions, such as program modules, being executed by a computer system 1500. Generally, program modules may include routines, programs, objects, components, logic, data structures, and so on that perform particular tasks or implement particular abstract data types. Computer system/server 1500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1500 is shown in the form of a general-purpose computing device. The components of computer system/server 1500 may include, but are not limited to, one or more processors or processing units 1502, a system memory 1504, and a bus 1506 that couples various system components including system memory 1504 to the processor 1502. Bus 1506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1500 typically includes a variety of computer system readable media. Such media may be any available media that is accessible by computer system/server 1500, and it includes both, volatile and non-volatile media, removable and non-removable media.

The system memory 1504 may include computer system readable media in the form of volatile memory, such as random access memory (RAM) 1508 and/or cache memory 1510. Computer system/server 1500 may further include other removable/non-removable, volatile/non-volatile computer system storage media. By way of example only, storage system 1512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, memory 1504 may include at least one program product having a set (e.g., at least one) of program modules that are configured to carry out the functions of embodiments of the invention.

Program/utility 1514, having a set (at least one) of program modules 1516, may be stored in memory 1504 by way of example, and not limitation, as well as an operating system, one or more application programs, other program modules, and program data. Each of the operating system, one or more application programs, other program modules, and program data or some combination thereof, may include an implementation of a networking environment. Program modules 1516 generally carry out the functions and/or methodologies of embodiments of the invention as described herein.

The computer system/server 1500 may also communicate with one or more external devices 1518 such as a keyboard, a pointing device, a display 1520, etc.; one or more devices that enable a user to interact with computer system/server 1500; and/or any devices (e.g., network card, modem, etc.) that enable computer system/server 1500 to communicate with one or more other computing devices. Such communication can occur via Input/Output (I/O) interfaces 1514.

Still yet, computer system/server 1500 may communicate with one or more networks such as a local area network (LAN), a general wide area network (WAN), and/or a public network (e.g., the Internet) via network adapter 1522. As depicted, network adapter 1522 may communicate with the other components of computer system/server 1500 via bus 1506. It should be understood that although not shown, other hardware and/or software components could be used in conjunction with computer system/server 1500. Examples, include, but are not limited to: microcode, device drivers, redundant processing units, external disk drive arrays, RAID systems, tape drives, and data archival storage systems, etc.

Additionally, the de-duplication system 1400 for updates in virtual machines may be attached to the bus system 1506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for de-duplication of updates in virtual machines being executed on a host computer system using a hypervisor, wherein a client virtual machine is derived from a base image, the method comprising:

creating a temporary virtual machine based on the base image;

updating the temporary virtual machine with the updates to produce an updated temporary virtual machine;
identifying modified blocks in an image of the updated temporary virtual machine when compared to the base image, the modified blocks comprising changed block content and added block content;
identifying files associated with the modified blocks in the image of the updated temporary virtual machine;
determining block identifiers of matching files in an image of the client virtual machine that correspond to the identified files associated with the modified blocks in the image of the updated temporary virtual machine;
moving block content of blocks identified by the determined block identifiers from its initial location to a free location within the client virtual machine if the block content and the matching files are not identical in the image of the client virtual machine and the image of the updated temporary virtual machine, the free location within the client virtual machine being identified as unused blocks in the image of the client virtual machine for which corresponding locations in the image of the temporary virtual machine and the image of the base image are also unused;
de-duplicating content within the client virtual machine that is duplicative of content within the updated temporary virtual machine by replacing block content at an initial location of the matching files in the image of the client virtual machine with pointers to corresponding blocks in the image of the updated temporary virtual machine;
generating a complete bootable image of the updated temporary virtual machine by incorporating, into the image of the updated temporary virtual machine, blocks of the base image which have not been updated; and
replacing the base image by the complete bootable image of the updated temporary virtual machine, the replacing making the image of the updated temporary virtual machine a new base image.

2. The method according to claim 1, wherein the creating a temporary virtual machine is performed by a copy-on-write technique.

3. The method according to claim 2, wherein the identifying modified blocks in the image of the updated temporary virtual machine comprises using block identifiers determined during performing the copy-on-write technique.

4. The method according to claim 1, wherein the updating the temporary virtual machine with the updates comprises booting the temporary virtual machine before the updating.

5. The method according to claim 1, wherein the replacing the base image by the image of the temporary virtual machine comprises deleting the base image and replacing all pointers to the base image in the client virtual machine with pointers to the new base image.

6. The method according to claim 1, wherein the de-duplicating content within the client virtual machine comprises ensuring that an original sequence of blocks of a matching file stays unchanged if compared to an original file.

7. A de-duplication system for updates in virtual machines being executed on a host computer system using a hypervisor, wherein a client virtual machine is derived from a base image stored on a host computer system, the de-duplication system comprising:

a memory; and
a processor communicatively coupled to the memory, wherein the de-duplication system performs a method comprising:
creating a temporary virtual machine based on the base image;
updating the temporary virtual machine with the updates to produce an updated temporary virtual machine;
identifying modified blocks in an image of the updated temporary virtual machine when compared to the base image, the modified blocks comprising changed block content and added block content;
identifying files associated with the modified blocks in the image of the updated temporary virtual machine;
determining block identifiers of matching files in an image of the client virtual machine that correspond to the identified files associated with the modified block in the image of the updated temporary virtual machine;
moving block content of blocks identified by the determined block identifiers from its initial location to a free location within the client virtual machine if the block content and the matching files are not identical in the image of the client virtual machine and the image of the updated temporary virtual machine, the free location within the client virtual machine being identified as unused blocks in the image of the client virtual machine for which corresponding locations in the image of the temporary virtual machine and the image of the base image are also unused;
de-duplicating content within the client virtual machine that is duplicative of content within the updated temporary virtual machine by replacing block content at an initial location of the matching files in the image of the client virtual machine with pointers to corresponding blocks in the image of the updated temporary virtual machine;
generating a complete bootable image of the updated temporary virtual machine by incorporating, into the image of the updated temporary virtual machine, blocks of the base image which have not been updated; and
replacing the base image by the complete bootable image of the updated temporary virtual machine, the replacing making the image of the updated temporary virtual machine a new base image.

8. The de-duplication system according to claim 7, wherein the creating a temporary virtual machine is performed by a copy-on-write technique.

9. The de-duplication system according to claim 8, wherein the identifying modified blocks in the image of the updated temporary virtual machine comprises using block identifiers determined during performing the copy-on-write technique.

10. The de-duplication system according to claim 7, wherein the updating the temporary virtual machine with the updates comprises booting the temporary virtual machine before the updating.

11. The de-duplication system according to claim 7, wherein the replacing the base image by the image of the temporary virtual machine comprises deleting the base image and replacing all pointers to the base image in the client virtual machine with pointers to the new base image.

12. The de-duplication system according to claim 7, wherein the de-duplicating content within the client virtual machine comprises ensuring that an original sequence of blocks of a matching file stays unchanged if compared to an original file.

13. A computer program product for de-duplication of updates in virtual machines being executed on a host computer system using a hypervisor, wherein a client virtual machine is derived from a base image, the computer program product comprising:

a computer readable storage medium having program instructions embodied therewith, the program instructions being executable by a computer system to cause the computer system to perform a method comprising:

creating a temporary virtual machine based on the base image;

updating the temporary virtual machine with the updates to produce an updated temporary virtual machine;

identifying modified blocks in an image of the updated temporary virtual machine when compared to the base image, the modified blocks comprising changed block content and added block content;

identifying files associated with the modified blocks in the image of the updated temporary virtual machine;

determining block identifiers of matching files in an image of the client virtual machine that correspond to the identified files associated with the modified blocks in the image of the updated temporary virtual machine;

moving block content of blocks identified by the determined block identifiers from its initial location to a free location within the client virtual machine if the block content and the matching files are not identical in the image of the client virtual machine and the image of the updated temporary virtual machine, the free location within the client virtual machine being identified as unused blocks in the image of the client virtual machine for which corresponding locations in the image of the temporary virtual machine and the image of the base image are also unused;

de-duplicating content within the client virtual machine that is duplicative of content within the updated temporary virtual machine by replacing block content at an initial location of the matching files in the image of the client virtual machine with pointers to corresponding blocks in the image of the updated temporary virtual machine;

generating a complete bootable image of the updated temporary virtual machine by incorporating, into the image of the updated temporary virtual machine, blocks of the base image which have not been updated; and replacing the base image by the complete bootable image of the updated temporary virtual machine, the replacing making the image of the updated temporary virtual machine a new base image.

* * * * *